May 31, 1938.  J. H. ZAECKEL  2,119,065
MOTOR CONTROL SYSTEM
Filed Aug. 8, 1935  4 Sheets-Sheet 1
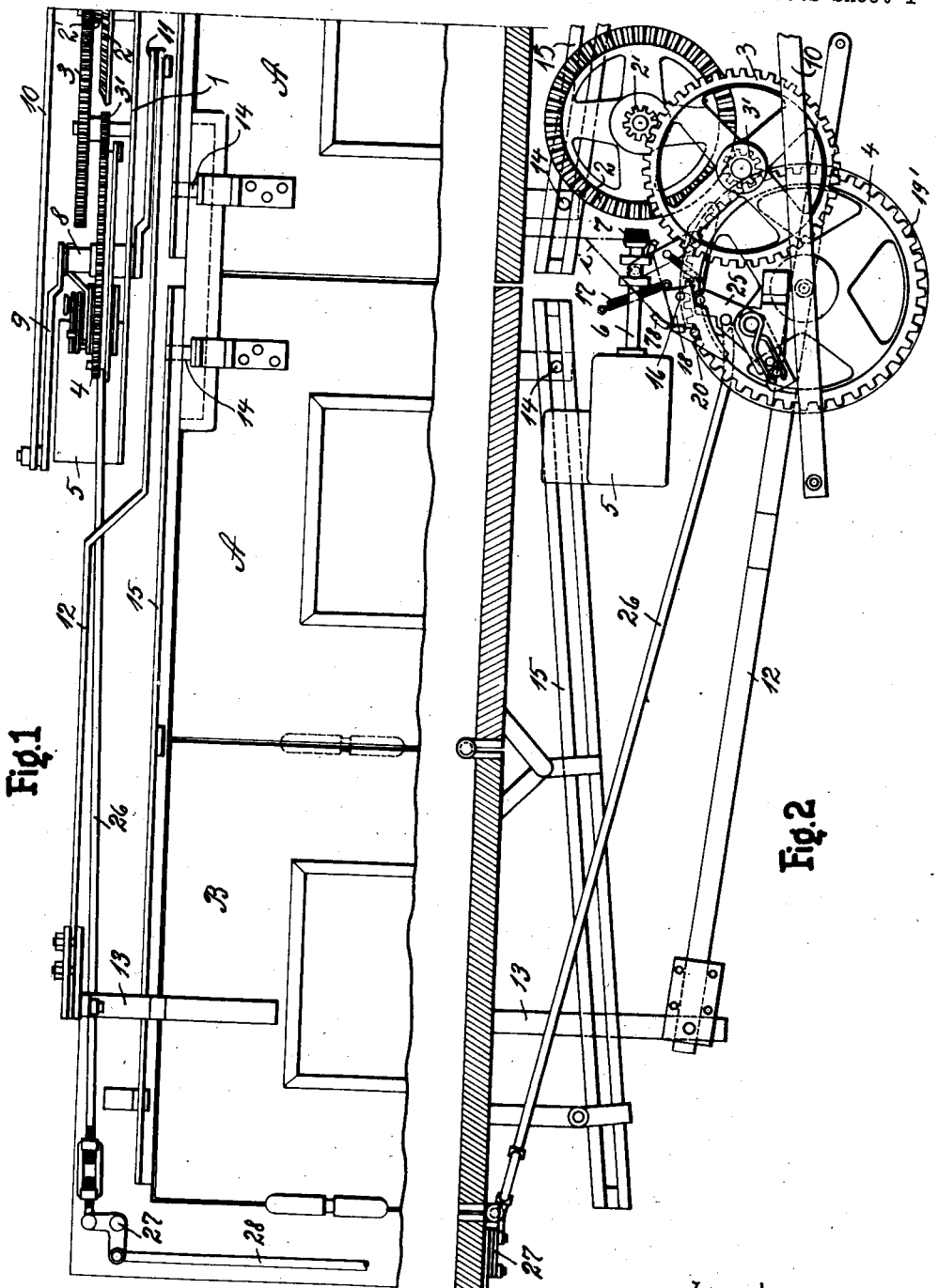
Inventor:
Johann Heinrich Zaeckel
by
his Attorney May 31, 1938.  J. H. ZAECKEL  2,119,065
MOTOR CONTROL SYSTEM
Filed Aug. 8, 1935  4 Sheets-Sheet 2
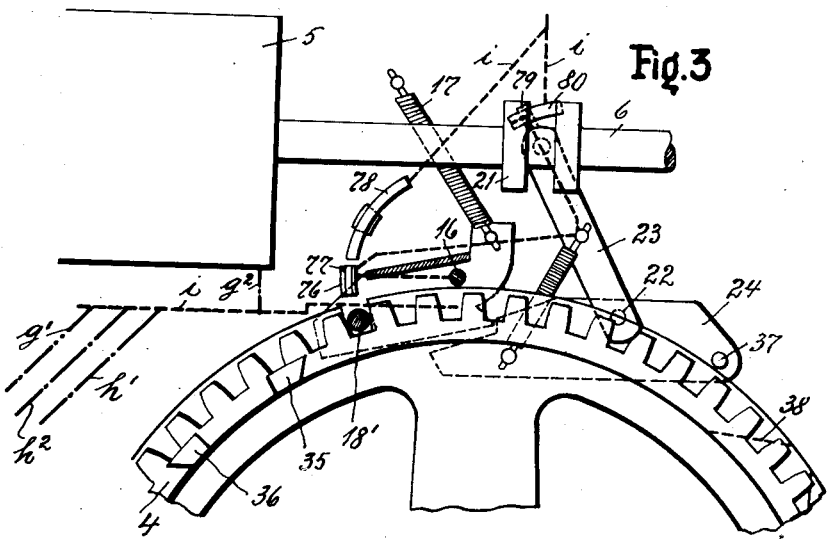
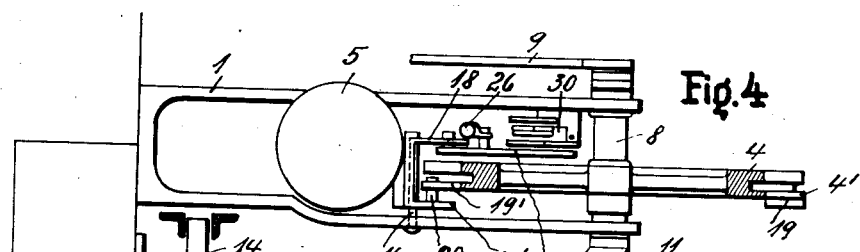
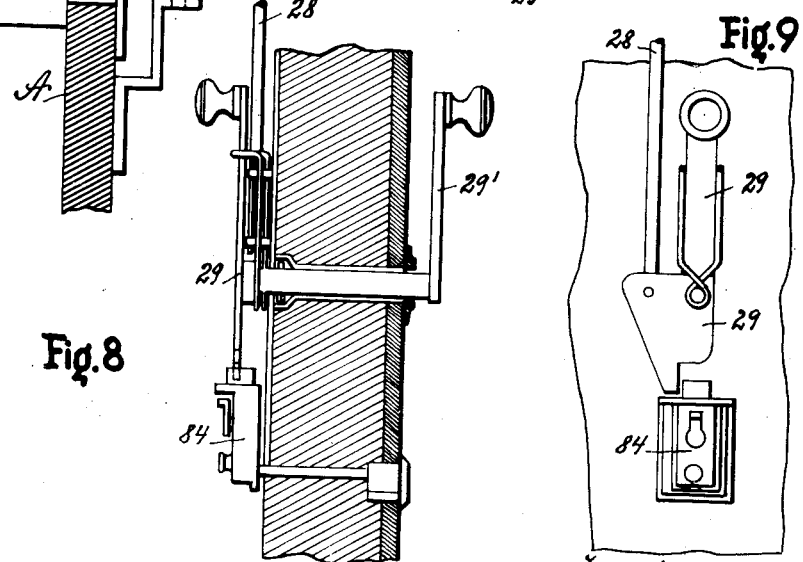
Inventor:
Johann Heinrich Zaeckel
by
his Attorney Inventor:
Johann Heinrich Zaeckel
by
his Attorney

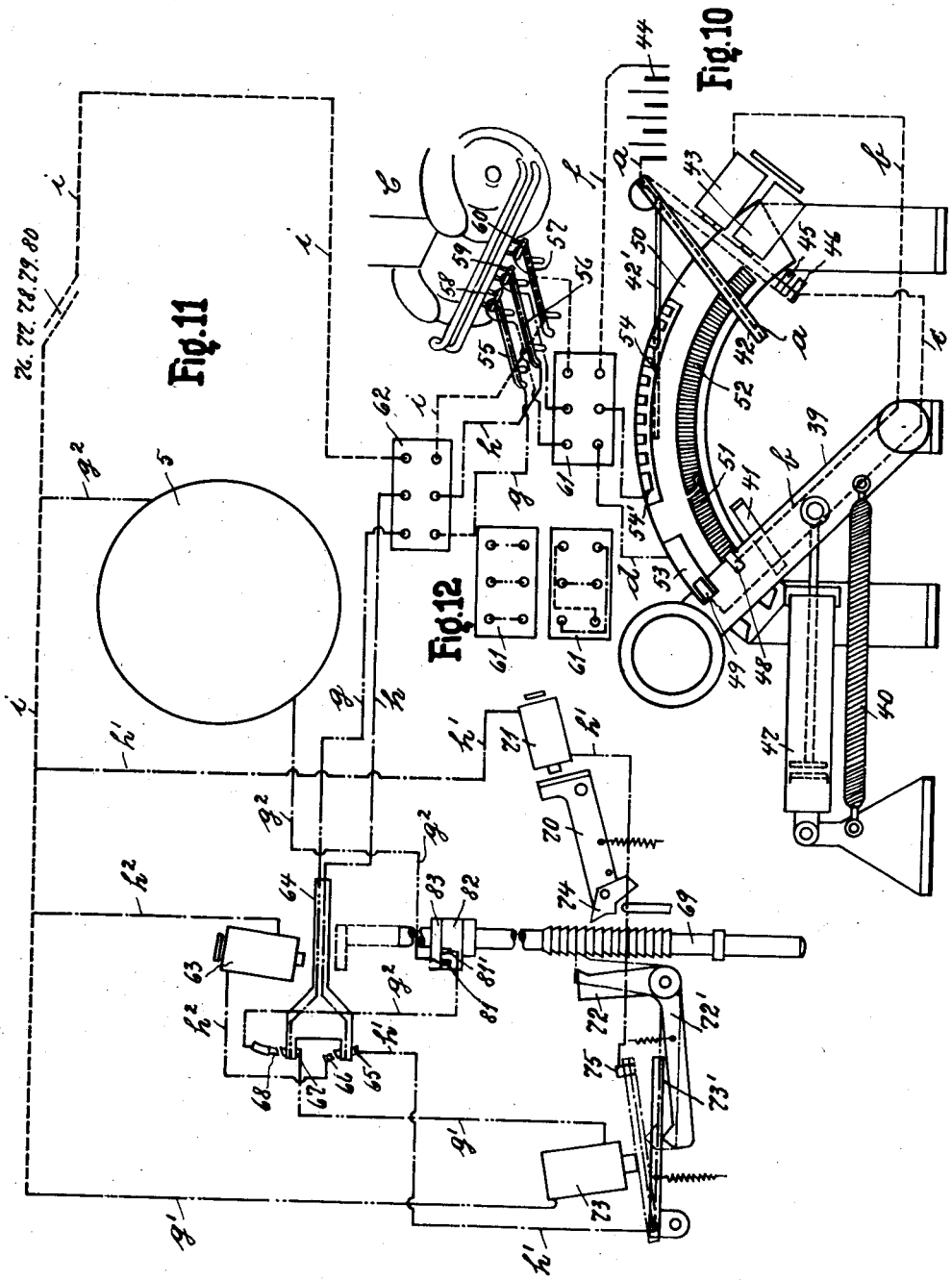

Patented May 31, 1938

2,119,065

UNITED STATES PATENT OFFICE 2,119,065

MOTOR CONTROL SYSTEM

Johann Heinrich Zaeckel, Lubeck, Germany

Application August 8, 1935, Serial No. 35,369
In Germany August 10, 1934

12 Claims. (Cl. 268—33)

This invention relates to an arrangement for opening and closing garage doors not only by hand but also from a motor car by switching on an electric motor. The arrangement is characterized in that for actuating the electric motor the current of the dynamo or battery of the car is utilized, which current is conducted through electric contacts arranged on the front of the car and through contact bars arranged directly on the surface of the ground.

The arrangement need not be connected to an electric supply main but the current is taken from the dynamo or battery of the car. To bring the car contacts to bear against the contact bars no particular care or accuracy is required, in any case not more than is necessary for running the car into the garage. When the car is standing in the proper position in front of the door, for entering the garage, the correct contacting takes place.

An embodiment of the invention is illustrated by way of example in the accompanying drawings in which:—

Fig. 1 shows in elevation the arrangement for opening and closing the door located above these doors.

Fig. 2 is a top plan view of Fig. 1.

Figs. 3 to 7 show details of the arrangement on an enlarged scale.

Figs. 8 and 9 show the arrangement for opening the door by hand.

Fig. 10 is a diagrammatic view of the electric installation in the car.

Fig. 11 is a similar view of the installation in the garage.

Fig. 12 shows two forms of construction of switch boards.

Figure 5:
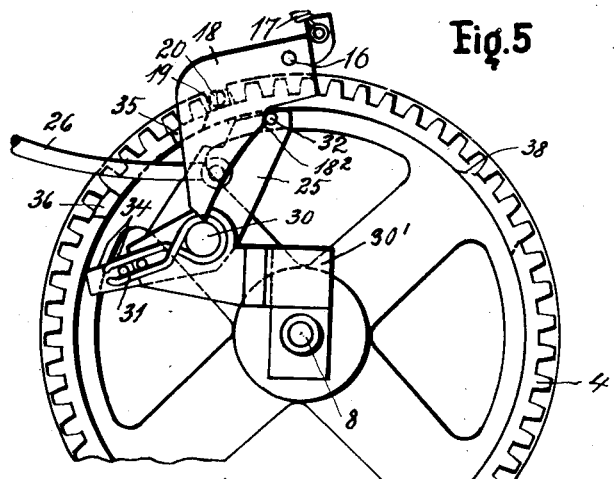
Figure 6:
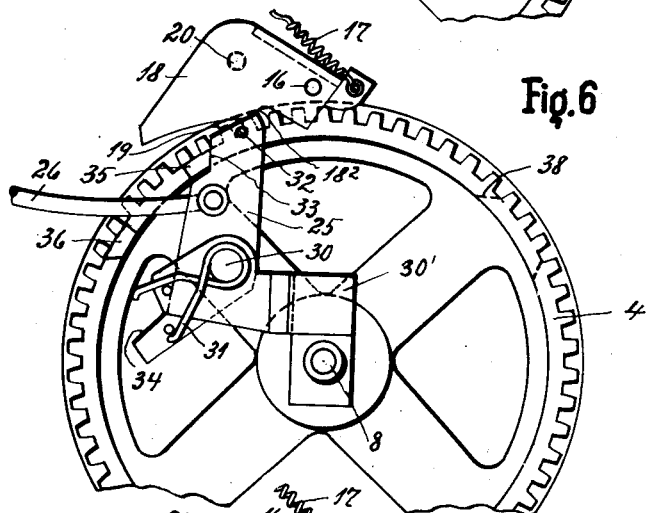

In the construction shown in the drawings the garage is closed by a double door opening to the right and left and consisting of two wings each composed of two hingedly connected parts A and B. A bracket 1 is arranged above the middle of the door, on which bracket toothed wheels 2, 3, and 4 are rotatably mounted, this bracket also carrying an electric motor 5 constructed as a starter motor. A bevel wheel 7 meshing with the toothed wheel 2 is mounted on the free end of a shaft 6 slidable in the direction of the longitudinal axis. A pinion $2^1$ connected with the toothed wheel 2 meshes with the toothed wheel 3 and a pinion $3^1$ connected with the toothed wheel 3 meshes with the toothed wheel 4 keyed on a shaft 8 journalled in the bracket 1. The upper end of this shaft 8 is tightly held in a bar 9 the free end of which is pivotally connected with a closing arm 10, whereas its lower end is securely held in a bar 11 the free end of which is pivotally connected with a closing arm 12. The free end of closing arm 12 is shiftably and pivotally connected with an arm 13 on the door part B, whereas the closing arm 10 is hingedly connected in a similar manner with the other door part B. The door parts A.A have pins 14 which are each slidable in a guide 15 to enable the door wings A and B to fold to the right and left during the opening operation.

A double pawl is oscillatably mounted at the side of the toothed wheel 4 on a shaft 16 journalled in the bracket 1 and acted upon by a spring 17, the part 18 of this pawl oscillating above the toothed wheel 4 (Figs. 4, 5, 6, 7) and its part $18^1$ oscillating below this toothed wheel 4 (Figs. 3, 4). The toothed wheel 4 has below its teeth a toothless edge $4^1$ (Fig. 4) with two opposite notches 19, $19^1$ in which a pin 20 mounted in the part $18^1$ engages alternately during the opening and closing of the doors and thus acts like a latch. The double pawl 18, $18^1$ is swung out of its locking position on the one hand by the motor 5, for which purpose two collars 21, $21^1$ are provided on the motor shaft 6, which collars control a bar 23 rotatable about a pin 22 and connected with a spring loaded slide 24 influencing the pawls 18, $18^1$, and on the other hand by a spring loaded crank 29, arranged laterally of the door and adapted to be actuated also from the other side of the door by a crank $29^1$. A rod 28 extends from the crank 29, which can be locked by a lock 84, to a swivel 27 rotatably connected with a rod 26 the other end of which is hingedly mounted on a lever plate 25. This plate 25 which is oscillatable about a pin 30 is acted upon by a spring 31 and provided with a pin 32 which engages a projection $18^2$ mounted on the pawl 18. The plate 25 has two abutment faces 33 and 34 which, during the oscillation of the plate 25 in one or other direction, contact with catches 35 or 36, so that the toothed wheel 4 is rotated through a small portion of a revolution in order to move the bars 9, 10 and 11, 12 out of or into their dead centre position. This is necessary when it is desired to open the doors by hand without actuating the gears 2, 3, 4.

The slide 24 is situated below the toothed wheel 4 and carries a pin 37 engaging with a catch 38 situated below the wheel 4 so that, during the rotation of the wheel 4, the slide 24 is caused to oscillate and to liberate the pawl 18, $18^1$ which then swings back under the action of the spring 17 into its locking position for the wheel 4.

A switching device is arranged in the car C (Fig. 10). This device consists of a hand lever 39 acted upon by a spring 40 and provided with an abutment 41. When the hand lever 39 is thrown over, the abutment 41 presses an armature 42 against a magnet 43 thereby connecting a wire a from a battery 44 with two contacts 45, 46. An air pump 47 regulates the speed of the return movement of the hand lever 39. A wire b leads from the contact 45 over the magnet 43 to a contact 48 arranged on the hand lever 39 and a wire c extends from the contact 46 to a contact 49 also arranged on the hand lever 39; both of the contacts 48 and 49 slide on a segment-shaped carrier 50 made of insulating material and carrying two contact strips 51, 52 for the sliding contact 48 and two other contact strips 53, 54 for the sliding contact 49, the contact 54 being constructed like a comb. The contact strip 51 is conductively connected with the contact strip 54 and the contact strip 52 with the contact strip 53.

Contact bars 55, 56, 57 are arranged directly above the ground in front of the garage door, and on the front of the car sliding contacts 58, 59, 60 are suspended, which are connected by wires $d$, $e$ with the contacts 53, 54 and by a wire $f$ with the battery 44, over a switch board 61, which, as shown in Fig. 12, can have different connections which must correspond with the connections of a switch board 62.

Three wires lead from the contacts 55, 56, 57 to the switching arrangement in the garage. This switching arrangement comprises a switch magnet 63 with armature 64 which connects the two contacts 55 and 56 by wires $g$, $h$ extending over the switch board 62 either with two contacts 65, 67 or with two contacts 66, 68. The switching arrangement also comprises a lifting spindle 69, which is raised intermittently by a spring loaded armature 70 provided with a rotatably mounted falling pawl 74 as soon as current impulses are sent into a lifting magnet 71, a spring loaded pawl 72 which in the position shown in dot-dash lines prevents the raised spindle from descending, and a switch magnet 73 the armature $73^1$ of which correspondingly influences the pawl 72.

The lifting spindle 69 can also be constructed as a rotary spindle or as a wheel segment provided with teeth.

The current coming from the motor and the different magnets returns to the battery 44 through a return lead $i$. This return lead $i$ extends to a contact 76 arranged on the pawl 18, $18^1$ which contact is connected with a contact 77 when the pawl is in its position of rest, and with the contact 78 when the pawl is lifted out of its notch. The contact 77 is also connected with a contact 79 arranged on the lever 23 and which, when the motor shaft 6 is retracted, bears against a contact 80 likewise connected up in the lead $i$. When the shaft 6 is pushed forward the lead $i$ is interrupted at this point.

In the return lead $i$ terminates a lead $g^2$ leading from the contact 68 over a contact 81 and the motor 5, a lead $h^1$ leading from the contact 65 to the armature $73^1$ and from the contact 75 to the lifting magnet 71, a lead $h^2$ extending from the contact 66 over the switch magnet 63 and a lead $g^1$ extending from the contact 67 over the switch magnet 73. The two contacts 81, $81^1$ are mounted on an exchangeable element 82 and electrically connected by means of a plate 83 mounted on the lifting spindle 69.

This arrangement operates in the following manner:—

To enable the door to be opened by hand, it must be possible to unlock it by lifting the pawl 18, $18^1$ out of engagement with the toothed wheel 4 and to turn the closing arms 9, 10 and 11, 12 out of their dead centre position in which they hold the door in closed position (Fig. 2). Both these operations are effected by turning the crank 29 or $29^1$ causing the lever plate 25 to swing through the intermediary of the rod system 28, 27 and 26 so that the pin 32 lifts the pawl 18, $18^1$ out of its locking position. At the same time the face 33 of the lever plate 25 butts against the catch 35 of the toothed wheel 4 causing this wheel to rotate through a part revolution. The door-wings A, B, A, B can now be pressed apart to the right and left, the pins 14 sliding in the guides 15 (Fig. 2).

Figure 7:
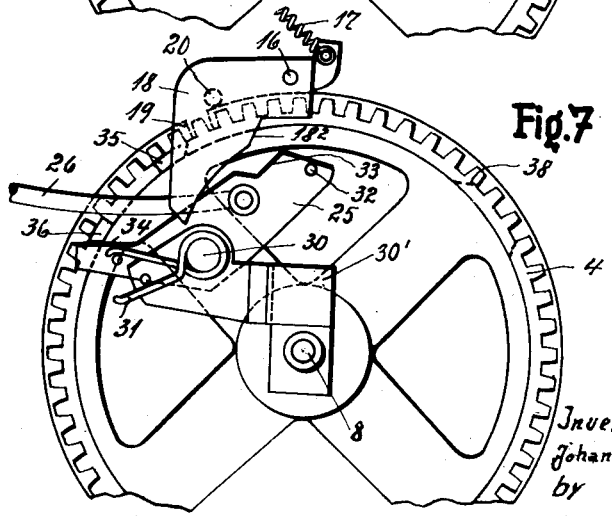

When the crank 29 is released it will be returned into its initial position under the action of its spring, thereby also swinging back the lever plate 25. The pawl 18, $18^1$ thus liberated likewise returns into its inoperative position, the pin 20 however cannot drop back into the notch 19 because the toothed wheel 4 has performed a part revolution. The pawl therefore rests in the edge $4^1$ and drops into the notch $19^1$ during the opening of the door and the consequent rotation of the wheel 4. The notch $19^1$ is so arranged that, when the door is open, the closing arms 9, 10 and 11, 12 are not quite in their dead centre position but shortly in front thereof, and moreover the notch is so shaped that it offers no resistance to the backward turning of the door, so that the door can easily be closed by hand. When the door is closed by hand, it is possible that owing to careless closing the door is not locked as the wheel 4 has not been rotated sufficiently far to move the closing arms 9, 10 and 11, 12 into their dead centre position and allow the pin 20 of the pawl 18 to fall into the notch 19. In this instance the lever plate 25 can be caused to swing by a movement of the crank 29 or $29^1$ in the opposite direction, so that the face 34 strikes against the catch 36 thereby rotating the wheel 4 until the locking operation has been completed (Fig. 7).

The manipulation by the cranks 29, $29^1$ for opening the door can be prevented by the lock 84 (Fig. 8).

When opening the doors from the car the following operation takes place:— The circuit arrangement for supplying the current is so arranged that the door can be opened only by a car having a circuit arrangement corresponding with that of the doors.

When the car is being run up to the door its contacts 58, 59, 60 bear against the contact bars 55, 56, 57 insulated on the ground (Fig. 11). If the lever 39 is swung over against the action of the spring 40, its abutment 41 presses the armature 42 against the main closing magnet 43, thereby securely holding the armature 42, and at the same time the two contacts 45, 46 are connected with the battery 44. A lead extends from each of these contacts to the switching apparatus in the interior of the garage. A lead $b$ leads from the contact 45 first over the main closing magnet 43. The magnet closing circuit is therefore battery $a$, $k$, contact 45, magnet 43, $b$, 48, 52, 53 $d$, 61, 58, 55 $g$, 62 $g^1$, 73, $g^1$, $i$, battery, contact 46, $c$, 49, 54, 61, 59, 56, $h$, 62, $h$, 65, $h^1$, 75, $h^1$, 71, $h^1$, $i$ battery. This magnet therefore receives current only when its armature 42 is in contact and is thus securely held. However, as soon as the circuit in which the magnet 43 is connected up is interrupted so that the magnet becomes currentless it releases its armature 42, and the circuit remains interrupted at the two contacts 45, 46 until the armature is again pressed by hand against the magnet 43. Through the connection of the two contacts 45, 46 the current from the battery 44 passes in the leads $g$, $h$ to the switch arrangement on the door. Each of these leads can be connected within the switching device of the door to two different leads, either to the leads $g^1$ and $h^1$ or to the leads $g^2$ and $h^2$. Which of these leads is actually connected up depends upon the position of the armature 64. There are consequently two main control switch circuits, one being $a$, $c$, $d$, 55, $g$, armature of main switch whence two wires $g^1$ and $g^2$ extend, the wire $g^1$ leading to the magnet 73 of the locking switch and thence to the common return lead $i$, and the wire $g^2$ leading to the motor 5 and thence to the common return lead $i$. The other circuit is $a$, $c$, $e$, 56, $h$ to armature of main switch whence two wires $h^1$ and $h^2$ extend, the wire $h^1$ passing to the armature $73^1$ of the locking switch, contact 75 to magnet 71 of lifting switch and thence to the common return lead $i$, whereas the other wire $h^2$ extends from the armature 64 to the main switch magnet and thence to the common return lead $i$.

During the operation of the switching device there are two different periods: First the time during which the spindle 69 is raised and secondly the time during which the motor is running. During the lifting of the spindle the leads $g^1$, $h^1$ must conduct current and whilst the motor is running the leads $g^2$, $h^2$ must conduct current. The lifting magnet 71, which periodically receives current, and the motor 5 receive their current directly from the battery 44. No resistance is series connected. The two switching magnets 73 and 63, which have only to hold their armatures $73^1$ and 64 respectively for effecting the control, receive the current which passes over the magnet 43 in the car. This is therefore always connected in series with one of the two magnets 63 and 73.

When the lever 39 in the car is released by the armature 42 after it has been thrown over and switched in the current the lever returns into its initial position under the action of the spring 40 being braked by the dash pot 41, and effects various contact connections. First the main closing magnet 43 is connected in the circuit $g$ as long as the contact 48 connected therewith by the wire $b$ is in contact with the contact strip 52. The lead $g$ is connected by the armature 64 being in its position of rest with the contact 67, from which the lead $g^1$ extends and leads to the switching magnet 73. As the magnet 73 is now under current, it attracts its armature $73^1$ which consequently no longer presses against the arm $72^1$ of the pawl 72 which it has securely held up to this instant, so that the pawl 72 moves towards the lifting spindle 69 and drops into a notch therein. At the same time the armature 64 connects the lead $h$ with the contact 65, from which the lead $h^1$ extends in which the lifting magnet 71 is situated. Owing to the fact that the switching magnet 73 has attracted its armature $73^1$, this armature has closed the lead $h^1$ at the contact 75. As soon as the contact 49 directly connected with the battery 44 in the car over the contact 46 comes into contact with a prong of the contact 54 during the swinging back of the lever 39, the lifting magnet 71 receives current and attracts its armature 70 and, as the pawl 74 of this armature engages in a step of the lifting spindle 69 it lifts this spindle one step. At its last stroke the plate 83 of this spindle 69 bears against the under side of the armature 64 and lifts the same so that the connection of the leads $g$ and $h$ through the contacts 65, 67 is interrupted and a connection is established between the lead $g$ and the lead $g^2$ which leads to the motor, and a connection is established between the lead $h$ and the lead $h^2$ in which the magnet 63 is connected up.

Whilst in the car the contact 49 is in contact with the contact $54^1$, the contact 48 bears not only against the contact 52 but at the same time against the contact strip 51 which is connected with the contact strip 54. The main closing magnet at this moment is connected up not only in the lead $g$ but at the same time also in the lead $h$, so that this lead $h$ receives current both over the contact 49 directly from the battery 44 and also over the main closing magnet 43 and the contact 48. The lead $g^1$ with the magnet 73 and the lead $h^1$ with the lifting magnet 71 are switched out and currentless, the latter also being currentless owing to the fact that the magnet 73 has released its armature $73^1$ which has thus interrupted the lead $h^1$ at contact 75. At the same time the armature $73^1$ again presses against the arm $72^1$ and thus pulls the pawl 72 away from the spindle 69 so that this spindle drops back into its initial position.

In this position the contact 81, $81^1$ closes and switches the motor 5 into the lead $g^2$. In the car the contact 49, as the lever 39 continues its return movement, no longer bears against the contact $54^1$ and the contact 48 is now only connected with the contact strip 51 connected with the contact $54^1$. The main closing magnet is now situated in the lead $h$, $h^2$ and series connected with the magnet 63. It is therefore displaced from the lead $g$ into the lead $h$, whereas at the same time the leads $g^1$ and $h^1$ have been replaced by the leads $g^2$ and $h^2$. As soon as the contact 49 in the car is connected with the contact strip 53, this being the case when the lever 39 has returned into its initial position, the lead $g$, $g^2$ to the motor is also closed and the motor receives current directly from the battery 44.

As soon as the motor receives current, its shaft 6 moves forward so that the toothed wheel 7 comes into mesh with the toothed wheel 2 which is connected with the toothed wheel 4 by the toothed wheels $2^a$, 3, $3^a$. During the forward movement of the shaft 6 the lever 23 will turn about its pin $23^1$ so that the slide 34 hingedly connected therewith will be moved in the opposite direction. The slide, before the toothed wheels 7 and 2 come into engagement, strikes against the pawl 18, $18^1$ and lifts the same out of its locking position so that the wheel 4 can rotate freely and the doors can be opened through the intermediary of the arms 9, 10 and 11, 12.

When the motor 5 is at a standstill and the shaft 6 pulled back, and when the pawl 18 is in its locking position, the lead $i$ is closed over the contacts 76, 77, 79, 80. When the pawl 18 is raised out of its locking position and the motor is running, the lead $i$ is closed over the contacts 76 and 78.

At the same time the contact 79 is moved away from the contact 80 and the lead interrupted at this point by the moving forward of the shaft 6 and on the resultant swinging of the lever 23.

As soon as the pawl 18, $18^1$ drops into a notch 19 or $19^1$, its contact 76 connects the lead $i$ with the contact 79 over the contact 77. As, however, the circuit is interrupted at the contact 79, the motor 5 becomes currentless and stops. The switch magnet 43 in the car also becomes currentless so that it releases its armature and the lead remains continually interrupted at this point. The opening or closing operation of the doors is then terminated and all the parts are in their initial positions.

It is not necessary for the contact connections to be established by exactly the mechanical arrangements illustrated in the drawings and above described. These are only given by way of example. The essential feature of the invention is that the different contact connections are effected on the one hand by a control lever in the car and on the other hand by the lifting spindle.

The number of prongs on the contact strip 54 and the height of the element 82 carrying the contacts 81, 81¹ must always be mutually proportioned. If for example the element 82 is too high in relation to the number of contact teeth, the plate 83 of the spindle 69 will already abut against the armature 64 before the contact 49 in the car has reached the contact 54¹. The main magnet 43 is then still in the lead $g$. By raising the armature 64 this lead will then be interrupted, because it has engaged over the contact 68 the lead $g^2$, which, however, is interrupted at the contact 81, 81¹ because the spindle is not in its position of rest. The current flowing over the main magnet 43 is thus interrupted and the armature 42 dropped so that the current is continually interrupted. On the other hand, if the element 82 is too low relatively to the number of contact prongs, the plate 83 of the spindle 69 will not yet have reached the armature 64 when the contact 49 in the car, has disengaged from the contact 54¹ and the contact 48 no longer bears against the contact 52 but bears against the contact 51. The main closing magnet is in the lead $h$, which receives current over the contacts 48, 51 and 54¹. As the armature 64 is not raised the leads $g^1$ and $h^1$ are still connected up. As the contact 49 has not yet reached the contact strip 53, the lead $g$ receives no current, so that the magnet 73 becomes currentless and allows its armature 73¹ to drop. Thus, the lead $h$ is interrupted so that the main closing magnet 43 connected up therein, becomes currentless and releases its armature 42.

The current for the motor 5 is therefore only switched on when the number of contact prongs 54 corresponds with the height of this element 82. For this purpose the part 50 in the car and the part 82 are exchangeable.

I claim:—

1. A motor control system for opening and closing garage doors selectively by hand and by the car battery, comprising in combination an electric motor, a stationary circuit connected to the motor, means in the stationary circuit for controlling its connection to the motor, a circuit on a car, a battery in the car circuit, means on the car for connecting its circuit to the stationary circuit, a switching lever on the car, a holding magnet in the car circuit, an armature for the magnet adapted to make and break the magnet's own circuit, and to be forced against the magnet and to energize the magnet under the action of the switching lever, a toothed wheel rotatable by said motor, a rod system operatively connected to said wheel and to the garage doors and driven by said wheel to open and shut the garage doors, a locking mechanism adapted to lock said wheel, means for disengaging said mechanism by hand, a mechanical means for disengaging said mechanism by said motor, and means operatively connected to the locking mechanism for de-energizing the holding magnet upon re-engagement of the locking mechanism and the wheel.

2. In a system as specified in claim 1 the locking mechanism comprising a toothless rim on the toothed wheel, having notches in its periphery, a pawl oscillatable at the side of said rim, a pin carried by said pawl and projecting across said rim, a spring connected to said pawl and adapted to oscillate the same to bring said pin into engagement with one of said notches to lock said wheel, the mechanical disengaging means comprising a second oscillatable pawl arranged adjacent said first mentioned pawl, a two armed lever connected at one end to said pawl, a pin on the other end of said lever, a shaft projecting from said motor and adapted to be axially shifted at the starting up of the motor, two collars on said shaft one on each side of said last mentioned pin and adapted to rock said lever during the axial displacement of said shaft and oscillate said first mentioned pawl through the intermediary of said second pawl to lift said pin out of engagement with the notch in said rim and release said gear wheel, and the means for disengaging said locking mechanism by hand comprising a rod system connected at one end to said pawl, a hand crank connected to the other end of said rod system and adapted to actuate said rod system, to oscillate said first mentioned pawl through the intermediary of said second pawl to lift said pin out of engagement with the notches in said rim.

3. In a system as specified in claim 1, a contact rail arranged in front of the garage door, an open circuit connecting said rail with said motor, the control device on the car comprising wide contact plates resiliently mounted on the front of the car and adapted to contact with said rail when the car is standing in front of the garage door, a circuit in said car connecting the motor battery with said contact plates and adapted to supplement said open circuit, a main magnet in said car circuit, and an armature of said magnet adapted to be depressed by hand to close said car circuit and said open circuit and connect said battery with the motor.

4. In a system as specified in claim 1, a contact rail arranged in front of the garage door, an open circuit connecting said rail with said motor, the control device on the car comprising wide contact plates resiliently mounted on the front of the car and adapted to contact with said rail when the car is standing in front of the garage door, a circuit in said car connecting the motor battery with said contact plates and adapted to supplement said open circuit, a main magnet in said car circuit, and an armature of said magnet adapted to be depressed by hand to close said car circuit and said open circuit and connect said battery with the motor, the car circuit having two branches between the battery and said magnet, one branch leading directly to the motor and the other indirectly to the motor over said magnet, a relay being arranged between said magnet and said motor, a common return wire for both of said branches of said car circuit, two break contacts connected in parallel in said return wire, one of said contacts held in breaking position by the motor shaft in extended position, and the other contact being maintained in breaking position when its pin is in engagement with a notch in the rim on the toothed wheel when the motor is running and its shaft is in extended position and at the same time the pawl engages in a notch, but is closed when either of these is not the case to temporarily interrupt the circuit to cause the magnet to release the armature and break the circuit and stop the motor.

5. In a system as specified in claim 1 the control device in the garage comprising a circuit connected with the motor, a spindle with a plurality of steps, a lifting magnet adapted to be energized by said circuit, an armature of said magnet adapted to engage the steps of said spindle and lift said spindle one step each time said lifting magnet is energized, and a main switch relay comprising a magnet, and an armature adapted to be pressed against said relay magnet by said spindle.

6. In a system as specified in claim 1 the control device in the garage comprising a circuit connected with the motor, a spindle with a plurality of steps, a lifting magnet adapted to be energized by said circuit, an armature of said magnet adapted to engage the steps of said spindle and lift said spindle one step each time said lifting magnet is energized, and a main switch relay comprising a magnet, and an armature adapted to be pressed against said relay magnet by said spindle, a spring loaded pawl adapted to engage in the steps of said spindle to maintain the same in its raised position, a control relay connected with said magnet adapted to close the circuit to said lifting magnet, and an armature of said control relay adapted to rock said pawl out of engagement with said spindle when said control relay is currentless.

7. In a system as specified in claim 1, the control devices comprising a circuit between the battery in the car and the motor in the garage, a main circuit making magnet in said circuit in said car, said circuit comprising two lead wires leading from said magnet and a common return wire to said battery, a lifting magnet in one of said lead wires, the other of said lead wires extending directly to said motor, a main control relay in said circuit, an armature of said main control relay adapted when said relay is currentless to connect the lead extending directly to said motor with the lead wire leading to said lifting magnet and the lead wire coming from the main circuit making magnet with the control relay of the lifting magnet but when the armature is attracted, to connect the lead wire coming directly from the battery with said motor and the lead wire coming from the main circuit closing magnet in the car with the magnet of said main control relay.

8. In an arrangement as specified in claim 1, the control device on the car comprising a circuit, a main circuit making magnet in said circuit, an armature of said magnet adapted to close said circuit, a hand operated switch lever adapted to press said armature against said magnet, and a spring adapted to return said lever into its initial position.

9. In a system as specified in claim 1 the control devices comprising a circuit having two lead wires and a common return wire, a lifting magnet in the garage connected up in one of said lead wires and adapted to close said circuit, a series of contacts in these lead wires, a hand operated switch lever in said circuit adapted to close said circuit to energize said lifting magnet, a spring adapted to return said lever into its initial position and said lever adapted to open and close said contacts during its return movement to impart impulses to said lifting magnet.

10. In a system as specified in claim 1 the control devices comprising a circuit having two lead wires and a common return wire, a lifting magnet in the garage connected up in one of said lead wires and adapted to close said circuit, a series of contacts in these lead wires, a hand operated switch lever in said circuit adapted to close said circuit to energize said lifting magnet, a spring adapted to return said lever into its initial position and said lever adapted to open and close said contacts during its return movement to impart impulses to said stroke magnet, a stroke spindle having a number of steps corresponding with the number of contacts, a pawl adapted to be attracted by said magnet at each impulse to raise said spindle one step, and a main control relay comprising a magnet and an armature adapted to be pressed against its magnet to close the circuit to said motor.

11. In a system as specified in claim 1 a circuit leading from the battery to the motor, comprising two lead wires and a common return wire, a main circuit closing magnet in said circuit, a main control relay in the garage connected up in one of said lead wires, a lifting magnet control relay in one of said lead wires adapted to actuate said main control relay, an armature of said lifting magnet connected in its position of rest with said stroke magnet control relay, a contact in said car, a series of contacts connected in the circuit with said step contact, a hand operated lever adapted to press said armature against said main control relay magnet, a spring adapted to return said lever into its initial position, said lever adapted to brush against said series of contacts during its return movement, and impart impulses to said step relay, and said armature adapted to maintain said contact in the car in closed position during the return movement of said lever.

12. In a system as specified in claim 1 a circuit leading from the battery to the motor, comprising two lead wires and a common return wire, a main circuit closing magnet in said circuit, a main control relay in the garage connected up in one of said lead wires, a lifting magnet control relay in one of said lead wires adapted to actuate said main control relay, an armature of said main control relay connected in its position of rest with said lifting magnet control relay, a contact in said car, a series of contacts connected in the circuit with said step contact, a hand operated lever adapted to press said armature against said main control relay magnet, a spring adapted to return said lever into its initial position, said lever adapted to brush against said series of contacts during its return movement, and impart impulses to said step relay, and said armature adapted to maintain said contact in the car in closed position during the return movement of said lever, two additional contacts in the car adapted to be closed by the return movement of said lever, one of said contacts adapted to connect according to the position of the lifting magnet the battery with the main control relay in the garage or with the motor respectively, and the other contact adapted to connect the main circuit closing magnet with the wire connected by the main control relay in the garage either with the control relay of the lifting magnet or with the magnet of the main control relay.

JOHANN HEINRICH ZAECKEL.